March 23, 1965  H. J. JABCZYNSKI ETAL  3,175,043
COUPLING FIELD SELECTION SYSTEM
Filed Sept. 22, 1958  9 Sheets-Sheet 1
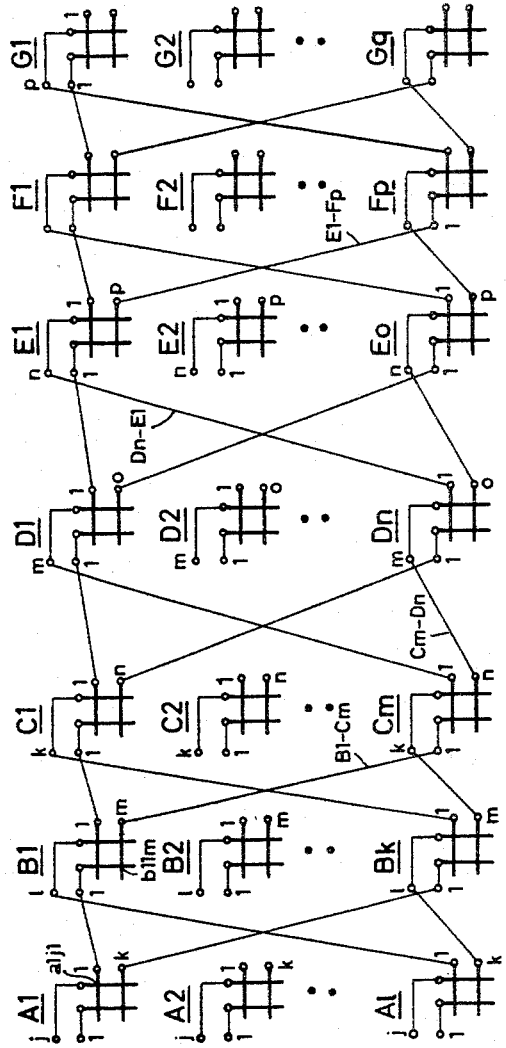
Inventors.
Hans Joachim Jabczynski,
Ulrich Körber, &
Dieter Voegtlen.

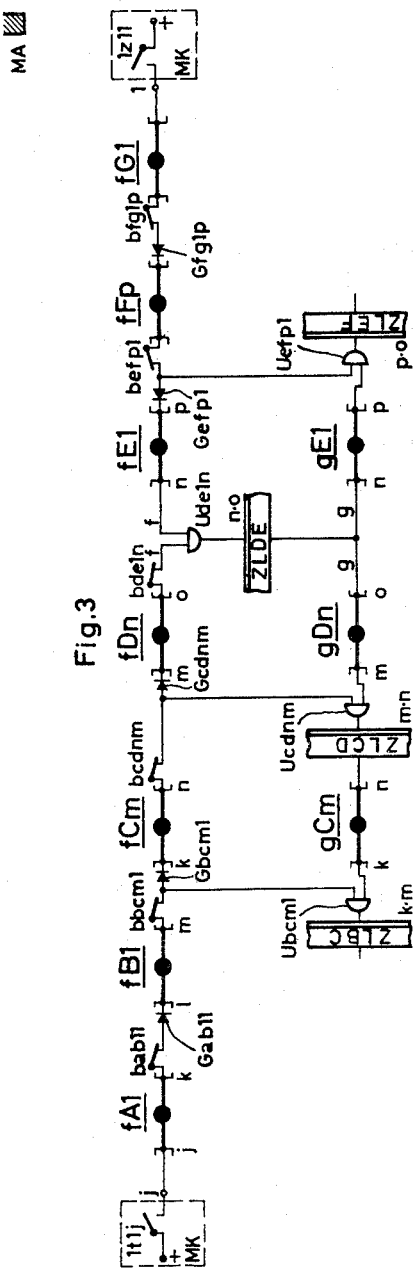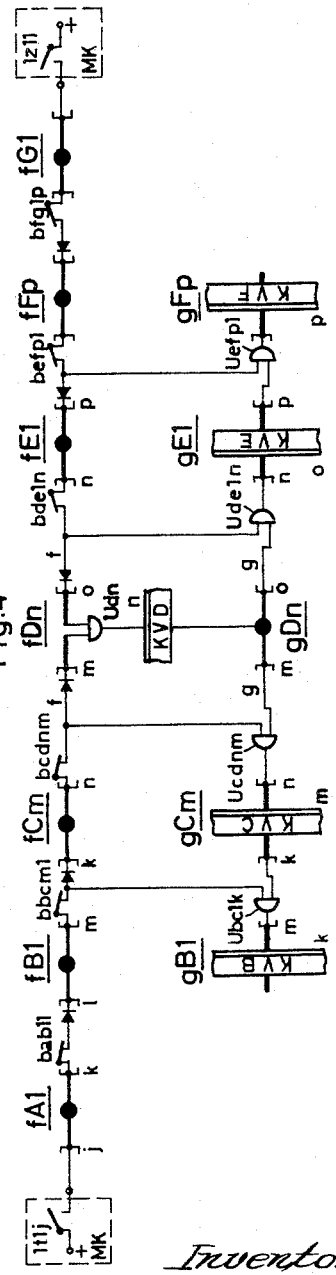

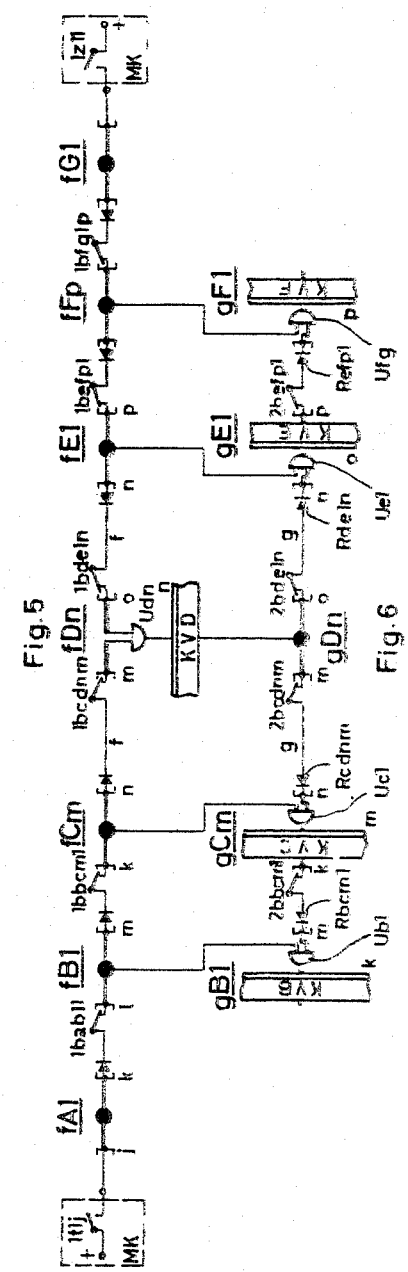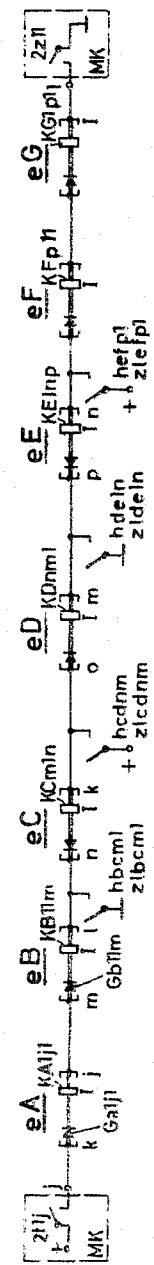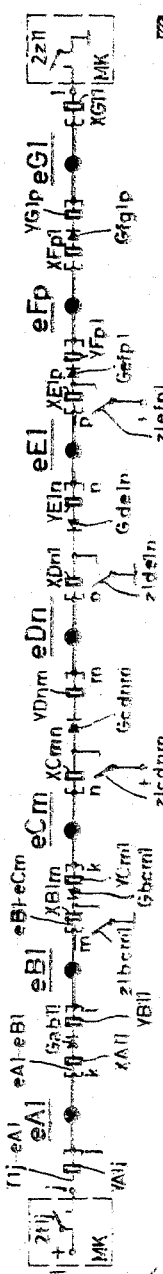

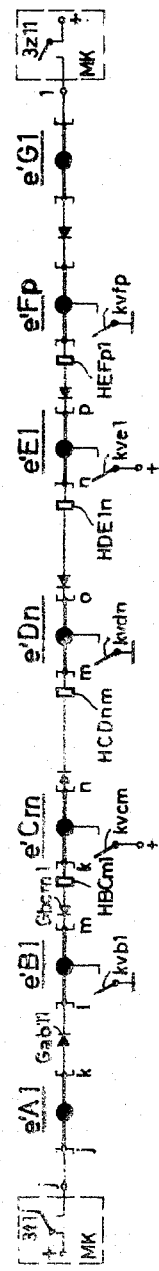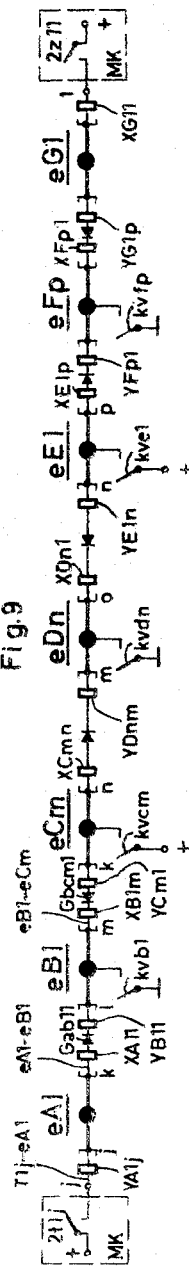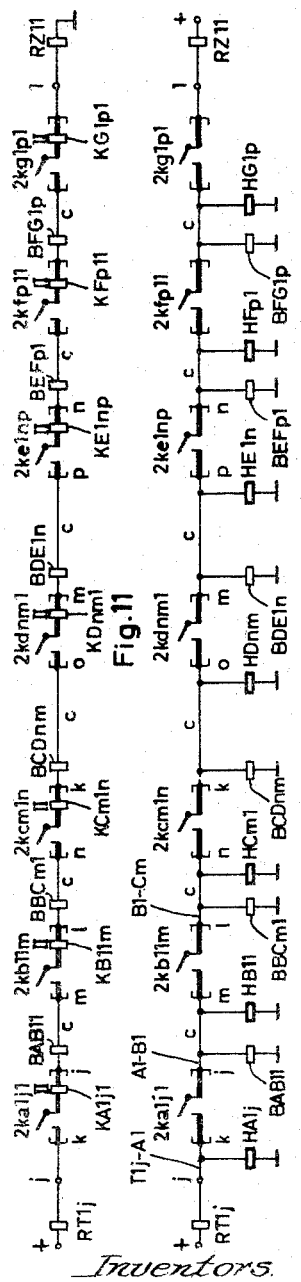

March 23, 1965  H. J. JABCZYNSKI ETAL  3,175,043
COUPLING FIELD SELECTION SYSTEM
Filed Sept. 22, 1958  9 Sheets-Sheet 9

Inventors.
Hans Joachim Jabczynski,
Ulrich Körber, &
Dieter Voegtlen.
By
Atty.

# United States Patent Office 3,175,043
Patented Mar. 23, 1965

3,175,043
COUPLING FIELD SELECTION SYSTEM
Hans Joachim Jabczynski, Munich-Solln, and Ulrich Korber and Dieter Voegtlen, Munich, Germany, assignors to Siemens and Halske Aktiengesellschaft Berlin and Munich, a corporation of Germany
Filed Sept. 22, 1958, Ser. No. 762,656
Claims priority, application Germany, Sept. 26, 1957, S 55,280
28 Claims. (Cl. 179—22)

This invention relates to a coupling field selection system and is particularly concerned with a system and circuit arrangement for hunting, selecting and extending connection paths in multiple-stage fields of coupling points.

Fields of coupling points of this kind are used, for example, in extending connections in telephone systems; United States Patent No. 2,779,824 may be mentioned as a pertinent disclosure, showing in FIG. 1 a field of coupling points subdivided in three stages, each stage containing coordinate switches, the switching contacts for these switches being arranged at the socalled coupling points.

The invention makes it with small expenditure of switching means possible to hunt for an idle connection path in a multiple-stage field of coupling points between the inlet and outlet sides thereof, and to select one of several available connection paths. The field of coupling points, also referred to, for example, in United States Patent No. 2,843,674 as "cross point network," will be hereafter referred to as coupling field. Methods will be described for effecting the operative actuation or setting of coupling points for the purpose of building up connection paths.

The coupling points are in the individual stages of the coupling field, also referred to as coupling stages, arranged in crossing fashion. Coupling points multipled according to lines and columns form a coupling multiple. For the realization of the coupling field, there may be used multiple-switches such, for example, as well known coordinate or crossbar switches as well as cross-coil switches or relay switches. A cross-coil switch is a coordinate switch comprising, for example, sealed-in electromagnetically operable contact springs which are actuated by energizing coils cooperating therewith and held in actuated position by holding coils arranged in crossing relationship with respect to the energizing coils. Examples of cross-coil switches may be found in Patent No. 2,983,792, dated May 9, 1961, and in copending application Serial No. 573,039, filed March 21, 1956, now U.S. Patent No. 3,053,938, owned by the assignee named in the present case. Relay switches arranged for operation in coordinate fashion are well known. At each coupling point, there is a coupling element which is operatively actuated when a connection is extended thereover. A plurality of so-called coupling point contacts may thereby be set. The individual coupling stages of the coupling field, which may contain a plurality of coupling multiples, are interconnected over trunk lines which may have several conductors, for example, line conductors over which voice currents are conducted, and private conductors serving control purposes. The arrangement of these trunk lines is determined by the grouping plan resulting from theoretical considerations based upon traffic requirements, that is, frequency of calls. If the trunk lines are arranged between two neighboring coupling stages in such a manner that certain coupling multiples of one coupling stage are over trunk lines exclusively connected with certain coupling multiples of the other coupling stage, and vice versa, these coupling multiples will form a coupling group extending over two neighboring coupling stages. Within neighboring coupling stages, there are, therefore, a plurality of coupling groups. If the coupling multiples respectively embrace all coupling multiples of the neighboring coupling stage, there will be a single coupling group in the two corresponding coupling stages. The trunk lines per coupling group are thereby preferably arranged in such a manner that at least one trunk line extends from each coupling multiple of one coupling stage to each coupling multiple of the neighboring coupling stage. Assuming that a coupling field, that is, a plural-stage field of coupling points, is constructed in this manner, a plurality of simultaneous calls will be extended successively, thereby in the absence of other particular precautions, avoiding endangering the extension of the individual calls.

The routing or handling of the calls is effected under control of a central or common device which will be referred to as marker, such marker being by way of information lines connected, among others, with the coupling field. There are moreover storage devices provided which receive information concerning calls to be made before the routing thereof. Waiting times are thereby necessarily introduced until the stored call informations are processed. Since the waiting times, for example, in a telephone system, must not exceed the duration of intervals required for intermediate selection operations, rapid execution of the hunting, selecting and extending of connection paths is required. This is obtained, among others, by the use of electronic switching means.

Several methods or systems are known for building up connection paths in coupling fields; however, all of them have various disadvantages. Some of these systems, for example, the system according to United States Patent No. 2,664,467, is characterized by the use of mutually displaced or staggered pulses for informing the marker, by way of information lines, about the operating condition of the trunk lines, namely, whether they are idle or busy, idle connection paths (trunks) being determined by coincidence of pulses. While the use of pulses reduces the number of information lines required, since each pulse phase represents a particular information, certain waiting times must be interposed to allow for ascertaining all coincidence possibilities. The routing of calls is thereby necessarily prolonged. These systems have, however, the further drawback of requiring for the production of the pulses a generator with a great number of separate outputs, thereby causing relatively great expenditure and imposing particular requirements with respect to the upper limit frequency of the information lines so as to adapt these lines to transmit the individual pulses with the required sequence frequency. The circuit arrangement according to the invention does not use impulse sequences, distinguishing thus basically from these systems and methods, and such systems and methods therefore need not be further discussed.

Of the remaining systems and methods in which the operating conditions of all trunk lines is in the routing or handling of a call simultaneously considered, some, for example, the crossbar V system, operates by transmitting to the marker over information lines the operating condition of the trunk lines, the marker thereupon selecting and combining the trunk lines which are suitable for the extension of a call, and selecting one connection path among several possible connection paths that might be available. The marker then effects over control lines the setting of the coupling point contacts disposed at the corresponding coupling points. The joining of a great number of information data which is thereby used in the marker for the building up of a connection path results in a complicated marker structure. A further disadvantage resides in the fact that such systems cannot be easily adapted to changing traffic requirements since a change in the disposition of intermediate lines requires rebuilding of the marker, which is separate from the coupling field.

Others of the systems in which the operating conditions of all intermediate lines are simultaneously considered in the processing of a call, for example, the system according to United States Nos. 2,686,837 and 2,655,559, do not effect the selection and combination of the trunk lines in the marker, but by means of a particular network for the path finding and the setting, such network corresponding in its line disposition to that of the coupling field or cross point network and being superposed thereon as a part thereof. The setting of the coupling point contacts for a selected connection path is effected by switching means included in the corresponding network. Since these switching means are individually allotted to the coupling points or to the trunk lines, they must be considered as being part of the coupling field or cross point network. The selection of a connection or routing path from several possible connection paths, is effected by the marker which is provided as central or common equipment. The marker in these systems accordingly has to perform fewer functions.

The known systems of the latter kind proceed from the thought that a certain inlet and a certain outlet of the coupling field are marked at the start of the hunting and selection operation, and that the attempt at effecting a connection or routing is made with respect to these marked inlets and outlets. For example, in a four-stage coupling field, those of the idle and, therefore, available trunk lines or trunk combinations are for this purpose initially sought by marking of the input, which lead from this input over two coupling stages to an intersection point extending through the trunk lines of the entire coupling field. Consequently, those of the trunk lines at the intersection point which belong to the available combination, are likewise marked. Part of these trunk lines are thereby marked from the outlet as well as from the inlet side of the coupling field, namely, the trunk lines which lie in the course of a connection path between the marked inlet and outlet. One of these trunk lines is now selected by means of a selector switch and the setting of the coupling contacts belonging to the corresponding connection path is effected by setting switching means disposed in the pathfinder or route-finder and setting network in the course of the corresponding path or route.

The expenditure so far as the marker is concerned is in this system relatively small and changes in the disposition of the trunk lines do not necessarily call for changes in the marker. However, particular switching means must instead be provided in the network for the route finding and setting, which belongs to the coupling field, the number of switching means proportional to the number of coupling points. It has been proposed, for example, to use a gas diode and a relay with three contacts for each coupling point. The end result is a considerably great expenditure. The use of this known system is moreover limited to coupling fields with a maximum of four coupling stages. The use of one and the same network for the route finding and for the settings also entails certain technical difficulties, which will be realized upon considering that the route finding and setting must be functionally separated in the network, such separation requiring current feed to the network for the route finding over high resistance means, so as to reduce the current to a valve at which the setting relays are not operatively actuated; for the operative setting, current is over low resistance means supplied to the network so as to obtain operative actuation of the corresponding relays. The necessity of subjecting the relays to such marginal requirements results in tolerances which are difficult to maintain.

The invention shows a way for avoiding the disadvantages of the above described system. The circuit arrangement according to the invention permits the provision of a coupling field with as many coupling stages as desired. The invention also avoids the above described marginal current requirements for the relays. The expenditures with respect to the coupling field are reduced by employing in advantageous manner particularly low cost switching means. The expenditures may be further reduced by particular grouping, allowing the use of the same switching means for different parts of the coupling field.

The method and system according to the invention serves for the hunting selection and setting of idle connection paths (path finding; routing) in a coupling field comprising as many coupling stages as desired. The hunting of idle trunk lines suitable for connection paths is effected by means of a route-finder network having conductors which are allotted to the trunk lines and in which the inlet and outlet belonging to a desired connection are simultaneously marked, whereby the marking of the corresponding inlet and outlet is over route-finder conductors allotted to idle trunk lines of the route-finder network transmitted to an intersecting point in a direction away from the inlet and outlet, respectively, the intersecting point extending transverse through the route-finder network parallel to a coupling stage, so that possible or available connection paths between inlet and outlet are marked.

A characteristic feature of the invention is that at the intersection point, which may be disposed at a desired place in the coupling field, a portion from the marked connection paths may be selected and thereupon marked, whereby this latter marking is transmitted to further intersecting points in opposite direction to the original marking in the route-finder network, such further intersecting points being displaced or staggered with respect to direction of inlet and outlet of the coupling field, whereupon a further corresponding path portion is selected at these staggered intersecting points, from the connection path, containing the selected path portion, by means of marking coinciding at the corresponding points, until a single path is determined in the route-finder network, by the markings from intersecting point to intersecting point and the selection of the respective path portions, which determines the connection path or route between the marked inlet and outlet and also those coupling point contacts to be used for extending the connection (routing) path through.

In the circuit arrangement for carrying out the corresponding operations there are provided in the route-finder network always first and second route-finder conductors, the first conductors for transmitting the markings extending respectively from the inlet and outlet to the first intersecting point and the second for transmitting the markings to the further intersecting points extending in opposite directions. At the individual intersection points, there are provided centrally disposed switches serving for the selection of the corresponding path or route portions and for marking at the same time the corresponding route portions which contain the means for setting the coupling point contacts, in a setting network which is separate from the route-finder network, the conductors of which are likewise allotted to the trunk lines, said setting means being operative to set the corresponding coupling point contacts under control of said marking, thereby extending the desired connection (routing) path through.

The foregoing and other objects and features will appear from the description which is rendered below with reference to the accompanying drawings. In these drawings, FIG. 1 shows by way of example a simple grouping plan for a seven-stage coupling field or cross point network;

FIG. 2 indicates the course of line or speech current or line conductors $a$ and $b$ for a connection route extending between an inlet and an outlet of the coupling field according to FIG. 1;

FIGS. 3, 4 and 5 illustrate three variants of the circuit arrangement for the hunting and selection, employing route-finder conductors $f$ and $g$;

FIGS. 6, 7, 8, 9 show examples of different circuitry for the setting conductors $e$; FIG. 6 showing a setting conductor for the variant according to FIG. 3, employing relay switches and FIG. 7 showing a setting conductor for the variant according to FIG. 3, employing cross-coil switches of the previously defined type. The setting conductors shown in FIGS. 8 and 6 are, upon using relay switches, part of to the variants of route-finder means indicated in FIGS. 4 and 5. Upon using cross-coil switches, the setting conductor shown in FIG. 9 will be employed;

FIG. 10 shows the circuitry of the seizure or private conductor for all three variants upon using relay switches, and FIG. 11 shows the circuitry for the seizure or private conductor $c$ when using in these variants cross-coil switches;

Figure 16:
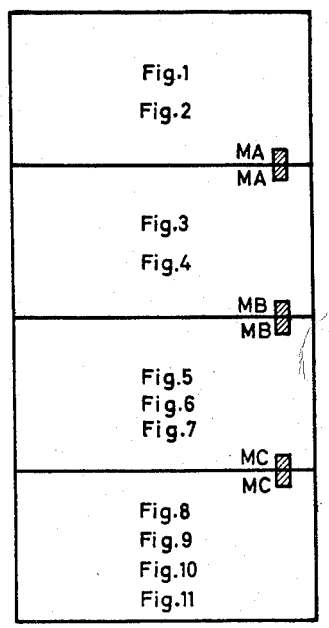

FIG. 16 shows the manner of aligning the FIGS. 1 to 11. The index marks MA, MB . . . MC should thereby be aligned so as to provide for the intended reading of the various circuits.

Upon placing the FIGS. 1 to 11 with the index marks in alignment as indicated in FIG. 16, the coupling multiples and marking points, provided in the various coupling stages, will appear in vertical alignment, thus facilitating the understanding of the mutual relationship existing between the various parts. Thus, the coupling point $a1j1$ (top left of FIG. 1) has a coupling point contact $1ka1j1$ (left end of FIG. 2) such contact being disposed in the respective line conductors $a$ and $b$, and a coupling point $2ka1j1$ (left end of FIG. 10) disposed in the seizure conductor $c$.

The coupling field shown in FIG. 1 and the representation of the speech current or line conductors shown in FIG. 2, will be explained first in order to aid understanding of the circuit arrangement according to the invention. FIG. 2 shows only one conductor with its various contacts. There are of course two such conductors, being the line conductors $a$ and $b$.

FIG. 1 shows a seven-stage coupling field comprising the coupling stages A to G. Each coupling stage contains a plurality of coupling multiples, each coupling multiple being realized by a multiple switch of the previously indicated type. Thus, for example, the coupling stage A comprises the coupling multiples or switches A1 to A$l$; the coupling stage B comprises the coupling multiples B1 to B$k$, etc. The coupling multiples of each stage are in this example similar. The inlets of the coupling field or cross point network are at the coupling stage A, constituting at the same time the inlets of the coupling multiples of this coupling stage. Each coupling multiple of the coupling stage A has $j$ inlets and $k$ outlets. Each multiple of this stage is by way of a trunk line connected with each coupling multiple of the coupling stage B. The stage B therefore has $k$ coupling multiples each with $l$ inlets; accordingly, each inlet of the coupling field of each coupling multiple can reach the coupling stage B. The structure of the coupling field continues in this manner over the further coupling stages. The outlets of the coupling multiples of the coupling stage G constitute also the outlets of the coupling field. The coupling multiples are indicated merely schematically and the trunk lines are shown only in part, each trunk line conveniently represented by a single line, each such trunk line actually comprising a plurality of conductors, including the line conductors $a$ and $b$ shown in FIG. 2. At the crossing points of the rows, that is, the lines (horizontal) and the columns (vertical) of the coupling multiples, that is, at the coupling points, there are provided contacts, in the multiple switches, which are respectively allotted to or associated with these coupling points and are, therefore, referred to as coupling point contacts. Thus, for example, there is in the coupling multiple A1 at the crossing point of the $j$-column and the first line, the coupling point $a1j1$ to which are allotted the coupling point contacts $1ka1j1$ (FIG. 2) and $2ka1j1$ (FIG. 10). Similarly, to the coupling point $b11m$ in the coupling multiple B1, there are allotted the coupling point contacts $1kb11m$ (FIG. 2) and $2kb11m$ (FIG. 10), etc. These coupling point contacts are included in the networks of the speech current or line conductors and in the seizure or private conductors, while certain other switching elements are provided at the corresponding places in the networks of the other conductors. In the networks of some of the conductors, switching means, in part single pole and in part included in the course of lines, are also connected to the trunk lines.

The grouping plan shown in FIG. 1 represents the scheme according to which the coupling multiples or rather to say the marking juncture allotted thereto, are over trunk lines interconnected in the various networks. The line conductors $a$ and $b$ of the coupling field are carried over coupling point contacts lying in the coupling multiples at the crossing points.

FIG. 2 represents the course of the line conductors $a$ and $b$ between an inlet and an outlet, there being assumed a particular connection route existing among the many possible connection routes. This connection route is determined in the course of the route finder operation, for example, by the setting, that is, by the closure, of the corresponding coupling point contacts. These coupling point contacts are shown in FIG. 2 in normal position, that is, opened. The corresponding connection extends, for example, from the coupling field inlet $T1j$ to the coupling field outlet $Z11$. The inlet $T1j$ lies at the $j$-inlet of the coupling multiple A1 of the coupling stage A and the outlet $Z11$ lies at the first outlet of the coupling multiple G1 of the coupling stage G. From the coupling field inlet $T1j$, the connection extends in this example over the coupling point contact $1ka1j1$ to the outlet 1 of the coupling multiple A1. The coupling point contact accordingly lies at the crossing point of the column $j$ and the line 1 of the coupling multiple A1. The multiple circuit symbols at the right and left of the coupling point contact $1ka1j1$ indicate that several coupling point contacts are always connected in the columns and lines of the coupling field. The left multiple symbol refers to coupling point contacts connected at a column and the right multiple symbol refers to $j$-coupling point contacts connected to a line. From the contact $1ka1j1$, there extends a trunk line to the inlet 1 of the coupling multiple B1 of the coupling stage B to which is connected the coupling point contact $1kb11m$ belonging to the illustrated connection path. Multiple symbols are again shown in connection with this contact. From the outlet $m$ of the multiple B1, there extends a trunk line to the first inlet of the multiple C$m$ of the coupling stage C. The connection path extends further over the coupling point contact $1kcm1n$ to the outlet $Z11$, by way of coupling point contacts $1kdnm1$, $1ke1np$, $1kfp11$ and $1kg1p1$.

The variants of path-or route-finder conductors shown in FIGS. 3, 4 and 5 may be subdivided into two groups. As already mention, a connection path is according to the invention determined by selecting suitable way or route portions until the connection path is clearly established. In accordance with the circuit shown in FIG. 3, these way portions are trunk lines of the coupling field and in accordance with FIGS. 4 and 5, they contain marking points indicated by prominent dots, the various portions corresponding to respective parts of the coupling multiples of the coupling field. The three circuit arrangements according to FIGS. 3, 4 and 5 show portions of the route-finder networks and respectively contain only the first route-finder conductors $f$ and the second route-finder conductors $g$ belonging to a connection path. As a matter of principle, a certain connection path or route is after hunting and selection of the corresponding way portion determined; it must thereafter be completed by setting the corresponding coupling point contacts. For this purpose, there are used the networks of the setting conductors and of the seizure or private conductors. The coupling point contacts are actuated by means of the switching devices included in the setting conductors, and such coupling point contacts are maintained in operated condition by means included in the private conductors until the corresponding connection is released either from the inlet side or the outlet side of the coupling field. Due to this expedient, the networks for the path or route finding and for the setting may be employed successively for building up many connection paths which thereupon remain set in the coupling field. The path finding as such is independent of the kind of multiple switches for the setting of the coupling point contacts; the kind of multiple switches becomes, however, effective in the construction of the networks of the setting conductors and of the private conductors.

The maintaining or holding of the coupling point contacts may be effected in a manner which is applicable to all variants of path finding, such maintaining or holding being illustrated in FIGS. 10 and 11. The switching means for the holding are connected to the network of the private conductors. The private conductors are carried over coupling point contacts which are arranged exactly as the coupling point contacts of the line conductors and are actuated simultaneously therewith. At each private conductor of trunk line there is connected a seizure means which upon seizure of the corresponding trunk line prevents the propagation or extension of the marking at the corresponding trunk line conductors of the network of the first pathfinder or route-finder conductors $f$ (FIG. 3, 4, 5). Such seizure means, as indicated in FIGS. 10 and 11, may be relays having contacts disposed in the pathfinder conductors, which contacts are in the described case interrupted. Other means may, however, be employed, for example, electronic means including coincidence circuits, sometimes also referred to as And-gates.

The path finding or route-finding system shown in FIG. 3 and the manner of actuating the coupling point contacts in the setting conductors according to FIGS. 6 and 7, to be considered in connection therewith, will now be described.

FIG. 3 shows the networks of the $f$- and $g$-conductors, that is, the pathfinder conductors, superimposed upon a part of the coupling field. FIG. 3 shows, in similar manner as FIG. 2, part of the corresponding network. The networks of these pathfinder conductors are, as already mentioned, built up or constructed according to the grouping scheme explained in connection with FIG. 1. However, they exhibit some peculiarities which are also shown in FIG. 3. The coupling multiples are substituted by so-called marking junctures or points, disposed in each juncture point, at which the pathfinder conductors are interconnected which are allotted to the trunk lines terminating in the corresponding coupling multiple. These marking junctures or points are indicated by prominent dots.

In FIG. 3 are shown for the $f$-conductors the marking junctures $fA1$, $fB1$, $fCm$, $fDn$, $fE1$, $fFp$ and $fG1$, and for the $g$-conductors the marking points $gCm$, $gDn$ and $gE1$. In addition, the previously mentioned seizure contacts are included in the $f$-conductors. In the $f$-conductor which belongs to the trunk line extending from the coupling point contact $1ka1j1$ to the coupling point contact $1kb11m$ (FIG. 2) is included the seizure contact $bab11$ (FIG. 3).

It belongs to the seizure or private relay BAB11 which is included in the associated seizure or private conductor (see FIG. 10) and which is energized upon seizure of the associated trunk conductor, thereby operatively actuating its contact $bab11$. The further seizure contacts $bbcm1$, $bcdnm$, $bde1n$, $befp1$ and $bfg1p$ are similarly included in the $f$-conductors. In addition, the decoupling rectifiers $Gab11$, $Gbcm1$, $Gcdnm$, $Gefp1$ and $Gfg1p$ are included in the $f$-conductors. No rectifier is included in the $f$-conductor extending between the marking points $fDn$ and $fE1$. At this point is disposed a first, already mentioned, intersection. The make contacts $1t1j$ and $1z11$ are allotted to the inlet $T1j$ and the outlet $Z11$ which are to be interconnected, such contacts being during the path finding actuated by the marker, whereby marking potential is placed on the illustrated $f$-conductors. The decoupling rectifiers are poled in such a way that the marking potential can be propagated thereover to the coupling field. The polarity of the marking potentials is such that, when the marking potentials reach simultaneously the inlets of the coincidence circuit $Ude1n$, lying in the trunk line between the marker points $fDn$ and $fEn$, a marking potential will also appear at their outlet. The $f$-conductors shown in FIG. 3 represent only part of the entire network of $f$-conductors. There are in the network as many marking junctures as there are coupling multiples in FIG. 1, the trunk lines extending therebetween. The marking potentials are, of course, extended from the marking junctures $fA1$ and $fG1$ over all connected idle trunk lines to several marking junctures in the coupling stages B and F and, therefore, also to several coincidence circuits $Ude1n$ . . . etc., in the trunk lines between the coupling stages D and E. The decoupling rectifiers in the trunk lines thereby prevent impermissible propagation of the marking potentials from the marking junctures rearwardly to other inlets or outlets of the coupling field, which would cause undesired omission of seized trunk lines which are interrupted by open seizure contacts.

There may also be mentioned the possibility that contacts may be provided in place of the individual contacts $1t1j$ and $1z11$, etc. for an inlet and an outlet, which are allotted to or associated with the inlets or outlets connected to the same coupling field. A trunk line switch ZLDE is connected to the outlets of the coincidence circuits $Ude1n$ . . . etc., such switch having as many inlets as there are trunk lines between the coupling stages D and E, that is, according to FIG. 1, $m.o$ inlets. Such switch has a corresponding number of outlets and marks one of them responsive to the marking of one or more of its inlets.

As mentioned before, in addition to the network of $f$-conductors, there is for the path finding or route-finding provided a second network of $g$-conductors. This network is likewise built up along the lines of the grouping scheme according to FIG. 1 and also has the described marking junctures in place of the coupling multiples. To the $g$-conductors disposed between the coupling stages D and E are connected the outlets of the trunk line switch ZLDE, and to the trunk lines extending between the other coupling stages are in this network connected And-gate or coincidence circuits with one input and its output. The other input of each of these coincidence circuits is connected to the corresponding conductor in the network of the $f$-conductors. The trunk line switch ZLDE marks in the network of the $g$-conductors one single trunk line. In the assumed example, this may be the trunk line extending between the coupling multiples $Dn$ and $E1$. The corresponding marking potential is propagated, over the respectively associated marking junctures $gDn$ and $gE1$ in the network of the $g$-conductors, toward the opposite sides or ends of the coupling field, that is, respectively in the directions of the corresponding inlets and outlets. Such marking potential reaches the coincidence circuits disposed in the trunk lines connected to the marking junctures $gDn$ and $gE1$ and can pass therethrough only in the presence of marking placed simultaneously on the second outlets connected to the $f$-conductors. The coincidence circuits marked at both inlets are disposed in the conductors of trunk lines which have already been marked from the corresponding inlet or outlet in the network of $f$-conductors and which at the same time belong to connection paths extending over the trunk line selected by the intermediate line switch ZLDE. The last considered coincidence circuits belong to trunk lines extending between coupling stages D and C as well as E and F. The corresponding trunk lines are, however, in the network of the $g$-conductors also connected each with a further trunk line switch, namely, switch ZLCD and ZLEF, respectively. The outlets of the coincidence circuits connected to the marking juncture $gDn$ are individually connected to inputs of the trunk line switch ZLCD. The outlets of the other coincidence circuits connected to other marker junctures of the coupling stage D are, of course likewise connected with further inlets of the switch ZLCD, so that such switch has a total of $m.n$ inlets, that is, as many inlets as there are trunk lines between the coupling stages D and C according to FIG. 1. The trunk line switch ZLCD has as many inlets as it has outlets, and marks one outlet responsive to a selection operation effected by the marking of one or more of its inlets, thereby selecting from several lines suitable for a connection path one selected trunk line extending between the coupling stages D and C. The selected trunk line is marked at the outlet of the switch in the network of the $g$-conductors. The marked trunk line shall be assumed to be the one belonging to the coincidence circuit $Ucdnm$, and the marking therefore will become effective at the marking point $Cm$. The marking potential effected by the trunk line switch ZLDE has thus as it were been propagated to the marking juncture or point $gCm$.

Further coincidence circuits such as $Ubcm1$ are similarly connected in the trunk lines leading from the marking joint $gCm$ in the direction of the input, such coincidence circuits operating in corresponding manner with respect to a trunk line switch ZLBC to which are also connected coincidence circuits extending from the other marking junctures of the coupling stage C. Switch ZLBC now selects in corresponding manner one trunk line of several suitable lines extending between the coupling stages C and B. It shall be assumed that the selected line is the one associated with the coincidence circuit $Ubcm1$. The connection path from the input $T1j$ up to the trunk line at the first intersection point is thus determined since the last selected trunk line determines a certain marking juncture in the coupling stage B and therewith the respectively associated coupling multiple, which is the coupling multiple B1 and since a certain coupling multiple of the coupling stage A, which is in the assumed case coupling multiple A1, has been determined by the actuation of the input contact $1t1j$. However, as is apparent from FIG. 2, only one connection path extends from the inlet $T1j$ over these two coupling multiples; always only one trunk line extending between the coupling multiples of neighboring coupling stages. The noted coincidence circuits disposed in the trunk lines in the network of the $g$-conductors (FIG. 3) are positioned in the coupling field with respect to the first intersection point at further intersection points, at which, as already described, a selection is upon coincidence occurrence effected from among the trunk lines which are at the corresponding points avaialble. A disturbing rearward extension of the marking potential in the direction of the first intersection point, is prevented in the $g$-conductors by the trunk line switches ZLCD and ZLEF.

And-gates or coincidence circuits such as $Uefp1$ and a trunk line switch ZLEF are also provided in the network of the $g$-conductors (FIG. 3) and connected in the trunk lines extending from the marking juncture $gE1$ in the direction of the outlets of the coupling field, serving for selecting, in analogous manner as described before, a trunk line extending between the coupling fields E and F, such selected line being assumed to be the one leading respectively to the marking juncture $gFg$ and the coupling multiple $Fg$. Since the coupling multiple G1 has already been determined by the outlet Z11 (FIGS. 1 and 2) there is now, as in the case of the inlet side, a selected connection path present leading from the first intersection point to the outlet Z11. The object of seeking a connection path is thereby attained, there being a certain route established in the pathfinder network. What remains is, to switch such route through by setting the respectively associated coupling point contacts, whereupon the pathfinder network will again be available for further selection purposes.

An example for the setting of the coupling point contacts according to this path finding operation will now be described, assuming the use of relay couplers switches as multiple switches. FIGS. 6 and 10 show the circuitry for the setting conductor and the seizure or private conductor, respectively. A network of setting conductors is being used which is arranged in accordance with the grouping plan shown in FIG. 1. At the crossing points, that is, at the coupling points of the columns and lines of the coupling multiple, there are respectively connected in broadly known manner, series circuits of decoupling diode rectifiers and energizing windings of the relays. FIG. 6 shows a portion of this network, such portion corresponding to the selected connection route or path extending between the input $T1j$ and the output $Z11$ shown in FIG. 1.

Upon completion of the path or route finding, contacts $2t1j$ and $2z11$ (FIG. 6) are closed by the marker. Contacts are in addition provided in connection with the trunk lines, which are allotted to or respectively associated with and operatively actuated by the trunk line switches responsive to the selection of the respective trunk lines. They are the make contacts $zlbcm1$, $zlcdnm$, $zlde1n$ and $zlefp1$. Upon actuation of these contacts, the coupling relays $KA1j1$, $KB11m$, $KCm1n$, $KDnm1$, $KE1np$, $KFp11$ and $KG1p1$, shown in FIG. 6, which are disposed at the corresponding coupling points, will be energized over their respective windings I and actuate their respectively associated contacts which are operatively disposed in the line conductors $a$ and $b$ (FIG. 2), at the corresponding coupling points, switching these conductors through. Similar contacts controlled by these relays are also disposed in the seizure or private conductor $c$ (FIG. 10). These contacts form a network which is likewise built up according to the grouping plan shown in FIG. 1, such network being in accordance with FIG. 10 carried over the series circuits of coupling point contacts $2ka1j1$ . . . etc. and holding windings II of the coupling relays $KAj1$ . . . etc. The input and output terminals of this network are connected to potentials causing, responsive to actuation of the coupling point contacts in the selected connection path, energization of the holding windings. The corresponding seizure or private relays are likewise energized. In the assumed example, there will be energized holding windings II of the coupling relays $KA1j1$, $KB11m$, $KCm1n$, $KDnm1$, $KE1np$, $KEg11$ and $KG1p1$ and also the private relays $BAB11$, $BBCm1$, $BCDnm$, $BDE1n$, $BEFp1$ and $BFG1p$. The marking of the setting network and of the pathfinder network need not be maintained further since the coupling point contacts are held actuated by the switching means connected to the seizure network, and such marking is therefore cancelled by the marker. Relays $RT1j$ and $RZ11$, shown in FIG. 10 are upon actuation of the coupling point contacts likewise energized and may be used to prevent renewed actuation of the contacts $1t1j$, $2t1j$, $1z11$, $2z11$ in the pathfinder network and in the setting network, by the marker, for the duration of the established connection.

The marker employed for certain functions in connection with the hunting, selecting and setting of the connection path is a known structure and detailed description thereof is therefore omitted. The primary function of the marker is to arrange for successively handling calls, the connection path or route being first determined by temporary marking in the pathfinder network (FIG. 3) whereupon marking is effected in the setting network (FIG. 6) so as to effect actuation of the corresponding coupling point contacts, the corresponding setting means in the network of the private conductors (FIG. 10) being thereafter for the duration of a connection maintained by corresponding holding circuits.

Other types of multiple switches, for example, coordinate switches, may be used in place of relay switches for the setting of the coupling point contacts. FIGS. 7 and 11 show an example employing previously noted socalled cross-coil switches for circuiting the setting conductors and the private conductors. It may be mentioned here that these cross-coil switches are in fact variants of coordinate switches and are related to the known crossbar switches. The coupling point contacts are disposed in the cross-coil switch in coordinate manner, as they would be in a crossbar switch and are controlled by setting or actuating means extending over lines and columns. In the crossbar switch, these control means are bridges and bars; in the cross-coil switch, they are represented by line coils and by column coils. Those of the coupling point contacts are operatively actuated which lie at the crossing point of an energized line coil and an energized column coil. Holding coils are provided for maintaining actuated coupling point contacts in actuated position, such holding coils being respectively associated with column coils and, when energized, being operative to maintain contacts disposed in the corresponding column in operated positon after disconnection of the corresponding line and column coils. The cross-coil switch is constructed so that a coupling point contact lying at the crossing point of an energized holding coil and an energized line coil is not actuated. Neither are coupling point contacts actuated responsive to energization of only one line coil or one column coil. The colmun coils are also referred to as Y-coils, the line coils as X-coils and the holding coils as H-coils.

As shown in FIG. 7, when cross-coil switches are used in connection with the network of setting conductors, marker joints take the place of coupling multiples, there being shown in FIG. 7 marking junctures $eA1$, $eB1$, $eCm$, $eDn$, $eE1$, $eFp$ and $eG1$. In the lines disposed between the inputs, the marking junctures and the outlets of the coupling field, there are disposed the X-coils and the Y-coils, in such a manner, that always those coils lie in the lines connected with a marking juncture, which control the coupling point contacts connected to these lines in the corresponding coupling field. There are moreover rectifiers connected in the trunk lines, for decoupling purposes. FIG. 7 shows as a portion of the network of setting conductors the course of the connection path or route that had been determined incident to the previously described path finding.

From the inlet contact $2t1j$ which is connected to the $j$-column of the coupling multiple $A1$ (FIG. 1) the path extends by way of the associated column coil $YA1j$ to the marking juncture $eA1$ and from there by way of the line coil $XA11$, decoupling rectifier $Gab11$ and the column coil $YB11$ to the next following marking juncture $eB1$. The path extends in similar manner over the trunk lines determined by the path finding, further to the marking juncture $eFp$ and then by way of the marking juncture $eG1$ to the outlet contact $2z11$. To the trunk lines determined by the path finding, there are connected the trunk line switch contacts $zlbcm1$, $zlcdnm$, $zldeln$ and $zlefp1$. Actuation of these contacts effects energization of the line- and column coils connected in the illustrated connection path and the coupling point contacts at the crossing points of the coils are consequently operatively actuated.

FIG. 11 shows the private or seizure conductor belonging to this connection path. The network of private conductors extends by way of coupling point contacts disposed in the coupling multiples. The respectively associated holding coils and seizure or private relays are connected to the trunk lines. Thus, to the trunk line conductor extending between the inlet relay $RT1j$ and the coupling point contact $2ka1j1$ there is connected the holding coil $HA1j$ and to the trunk line conductor extending between this coupling point contact and the coupling point contact $2kb11m$ there is connected the holding coil $HB11$ and the seizure or private relay $BAB11$. The further holding coils and private relays are in corresponding manner connected to the following trunk lines. When the corresponding coupling point contacts are actuated responsive to energization of the column and line coils in the network of the setting conductors, the holding coils and the seizure or private relays shown in FIG. 11 will be energized. The holding coils effect holding of the coupling point contacts after current is again disconnected from the setting conductors. The private relays mark the corresponding trunk lines as being busy. The inlet relay $RT1j$ and the outlet relay $RZ11$, which are likewise energized prevent actuation, by the marker, of the contacts $1t1j$, $2t1j$ and $1z11$, $2z11$ in the other networks, during the time the connection is established.

FIG. 4 illustrates the one variant of those pathfinder or routing systems in which the connection path is determined by the determination of those coupling multiples over which it extends. The networks of the pathfinder conductors $f$ and $g$ are likewise built up in accordance with the scheme explained in connection with FIG. 1; however, marking junctures are used in place of the coupling multiples. Moreover, private or seizure contacts and decoupling rectifiers are connected in the trunk lines in the networks of the $f$-conductors, which have the same functions as those shown in the circuit according to FIG. 3. In contradistinction to this circuit, the first intersection point does, however, not extend through the individual trunk lines but extends through a marking juncture lying in a certain coupling stage, namely, in the assumed example, the coupling stage D. Accordingly, the corresponding marking junctures are cut and the inputs of Andgates or coincidence circuits are connected at the corresponding points. At the marking juncture $fDn$ shown in FIG. 4 is connected the coincidence circuit $Udn$. FIG. 4, just as FIG. 3, shows but a part of the entire network of pathfinder conductors. The construction of the networks of the $f$-conductors is in FIGS. 3 and 4 similar except that the intersection point extends in FIG. 4 through the marking junctures. At the intersection point in the coupling stage D are $n$ marking junctures according to the grouping explained in connection with FIG. 1. A coincidence circuit is at each marking juncture. These $n$ coincidence circuits operate with respect to a coupling multiple switch KVD which has $n$ inlets and as many outlets. As in the circuit according to FIG. 3, when an inlet and an outlet of the coupling field are provided with marking potential, which takes place by way of the make contacts $1t1j$ and $1z11$, those of the coincidence circuits will be marked at the first intersection point at both inlets, which are accessible over idle trunk lines from the inlet as well as from the outlet. The marking of the two coincidence circuits marked on both inlets will be propagated to the inlets of the coupling multiple switch KVD which selects and marks one corresponding outlet.

To the outlets of the coupling multiple switch KVD are connected the marking junctures of the coupling stage D of the network of the $g$-conductors. Accordingly, one of there marking junctures is marked by the coupling multiple switch KVD. This determines at the first intersection point the marking juncture over which the connection path between the inlet $T1j$ and the outlet $Z11$ (FIG. 1) is to extend. In the assumed example, this is the marking juncture $gDn$ shown in FIG. 4. From this marking joint $gDn$, the marking is propagated to the opposite outer sides of the coupling field, that is, in the direction of the inlets and of the outlets, over the g-conductors and those of the trunk line conductors which have not yet been seized and which are in the network of the f-conductors already marked from the inlet or outlet of the coupling field. This is attained by means of the coincidence circuits connected with an input and an output to the g-conductors, the second outputs of which are connected to the corresponding trunk line conductors in the network of the f-conductors. This operation corresponds to that described in connection with FIG. 3, except that the individual g-conductors do not extend over trunk line switches. Coupling multiple switches are instead connected in the marker junctures of the coupling stages neighboring to the first intersection point. The coupling multiple switch KVC (FIG. 4) is connected in the marking junctures of the coupling stage C and the coupling multiple switch KVE is connected in the coupling stage E. Coupling multiple switches KVB and KVF are in similar manner respectively connected to the marking juncture of the coupling stage B and to the marking juncture of the coupling stage F. The marking junctures of one and the same coupling stage are thereby individually extended over an inlet and an outlet of the corresponding coupling multiple switch, the inlets lying in the direction of the first intersection point. In case one or more inlets of a coupling multiple switch are marked, such marking is by a selection operation extended over an outlet. For example, if the marking juncture $gDn$ is marked, the corresponding marking will be extended to the marking juncture $gCm$ by way of the coincidence circuit $Ucdnm$. The marking may moreover also be extended to other, not illustrated marking junctures of the coupling stage C. The coupling multiple switch KVC is marked at the inlets connected to this marking juncture and extends such marking to one of its outlets which shall be assumed to be the outlet connected to the marking juncture $gCm$. This marking is now in similar manner extended or propagated, over trunk lines in the network of the g-conductors, to the marking juncture of the coupling stage B, effecting at the coupling multiple switch KVB a corresponding operation which selects and determines a coupling multiple of the stage B. A coupling multiple is thus determined in each coupling stage from the first intersection point on in the direction of the corresponding inlet, over which the connection path or route is to extend, coupling multiples having been selected by coupling multiple switches in the coupling stages B, C and D and the coupling multiple in the coupling stage A being already determined by the corresponding inlet which is connected to a predetermined coupling multiple which in the assumed example is the coupling multiple A1. The determination of these coupling multiples is equivalent to determination of a given connection path from the corresponding inlet to the coupling multiple $Dn$ at the first intersection point since according to the grouping plan (FIG. 1) only one trunk line extends between two coupling multiples in neighboring coupling stages.

The determination of the connection path in the direction of the outlet is effected by means of the network of g-conductors and associated coincidence circuits and coupling multiple switches KVE and KVF, in similar manner as the determination of the connection path is effected from the coupling multiple $Dn$ in the direction of the inlet. It shall be assumed that the resulting path extends by way of the coupling multiples E1, Fp and G1 (see also FIG. 1) the last named coupling multiple G1 being already determined by the outlet Z11. The g-conductor extending over the coupling multiples E1 and Fp is indicated in FIG. 4. It may also be mentioned that coincidence circuits connected in the g-conductors prevent undesired propagation of the marking potential in the direction of the first intersection point, which would disturb the operation of the circuit arrangement. Potentials reaching the output of a coincidence circuit are not extended to its input. It will further be understood that the intersections neighboring to the first intersection, at which the selection of further coupling multiples is in accordance with the invention effected, extend through the marking junctures in the neighboring and further coupling stages. The entire connection path extending between the inlet T1j and outlet Z11 is determined upon the selection of these coupling multiples. The operative setting of the respectively associated coupling point contacts will be presently described.

FIG. 5 shows another variant of the pathfinder or routing system in which determination of coupling multiples is effected. The structure of the network of the f-conductors corresponds to that of FIG. 4. The first intersection is again at the coupling stage D and extends through the marking junctures provided in such stage, where the coincidence circuits are connected which operate with respect to the coupling multiple switch KVD, such switch marking in a given case a marking juncture of the coupling stage D in the network of the g-conductors, such marking juncture being again assumed to be the joint $gDn$. From the marking juncture of the coupling stage D extend in this network trunk lines to the marking junctures of the neighboring coupling stages C and E and from there to the further coupling stages, etc. In these trunk lines are disposed seizure or private contacts $2bcdnm$, $2bde1n$ . . . etc., which are operatively actuated together with corresponding seizure or private contacts $1bcdnm$, $1bde1$ . . . etc. disposed in the network of the f-conductors, and also decoupling rectifiers $Rcdnm$, $Rde1n$ . . . etc., such rectifiers preventing upon propagation of the marking potential from one marking juncture to the neighboring coupling stage bypassing of open seizure contacts. The marking junctures neighboring on the first intersection and further coupling stages are carried over coupling multiple switches as in FIG. 4. There are in addition coincidence circuits $Uc1$, $Ue1$ . . . etc. disposed ahead of the inlets of the coupling multiple switches, one inlet thereof being connected to the corresponding marking juncture and the other inlet being connected to the respectively associated marking juncture of the f-conductor network.

The path finding or routing operation will now be described more in detail.

A marking juncture of the coupling stage D, namely, the marking juncture $gDn$ is determined and marked in the same manner as described in connection with FIG. 4. The marking is propagated from the marking juncture $gDn$ along the network of the g-conductors over idle trunk lines to the neighboring coupling stage. At those marking junctures of the coupling stage C which are being marked from the marking juncture $gDn$ over idle trunk lines and at which the respectively associated coincidence circuits are simultaneously marked from the associated marking juncture of the f-conductor network, are also marked the inlets of the coupling multiple switch KVC. Those are the marking junctures which lie in idle connection paths extending from the corresponding inlet T1j to the coupling stage D and which moreover extend over the already selected marking juncture $gDn$ of this coupling stage. They are in other words marking junctures suitable for the path finding. One of these marking junctures, assumed to be the juncture $gCm$, is selected and marked by the coupling multiple switch KVC. This marking is in analogous manner propagated or extended from the marking juncture $gCm$ to the marking joint of the coupling stage B where a marking juncture, for example, $gB1$ is selected in similar manner. A suitable connection path is therewith determined between the inlet T1j and the coupling multiple $Dn$. A connection path extending between the coupling multiple $Dn$ and outlet Z11 is determined similarly, such connection path being assumed to extend over the coupling multiples E1, Ep and G1. The entire connection path extending between the corresponding inlet and outlet is thus determined by the selection of marking junctures corresponding to coupling multiples. As a result of the path finding in this variant, there will be obtained, exactly as in the case of the previously described embodiments, a determination of a coupling multiple in each coupling stage.

A comparison of all three pathfinder variants will show that it is in view of the marking always of one single outlet and one single inlet of the coupling field, unnecessary to select in each case a trunk line leading to a certain coupling multiple of the inlet coupling stage A or to the outlet coupling stage G or to select a predetermined coupling multiple in each of these coupling stages in the pathfinder network. It would be entirely possible, if desired, to provide switches in the pathfinder network for determining coupling multiples in the respective coupling stages.

The setting of the coupling point contacts may in case of FIGS. 4 and 5 be effected in the same manner. In the embodiments to be described next, there are provided coupling multiple switches having contacts which are individually allotted to the outlets, such contacts being actuated upon marking the corresponding outlets and thereby affecting the setting switching means. It is understood, of course, that electronic means may be provided in place of such contacts.

An example will first be given for the setting of the coupling point contacts by the use of relay couplers as multiple switches. FIGS. 6 and 8 show portions of the setting or actuating networks used for this purpose. For the holding of the contacts there is provided a network of seizure or private conductors, part of which is shown in FIG. 10. For the setting there is provided a setting network having first and second conductors. FIG. 8 shows a portion of the network of the first conductors and FIG. 6 shows a portion of the network of the second conductors. The network of first conductors is built up according to the grouping plan shown in FIG. 1 except that marking junctures are used instead of coupling multiples. Decoupling rectifiers and special auxiliary setting relays are disposed in the trunk lines. In FIG. 8, these are the relays HBC$m$1, HCD$nm$, HDE1$n$ and HEF$p$1. Auxiliary setting relays are omitted in the trunk lines between the coupling stages A, B and F, G, that is between the pairs of coupling stages located toward the opposite ends of the coupling field. Contacts of the corresponding coupling multiple switches are connected to the marking junctures which are disposed in the pathfinder network in the coupling stages at which there are provided coupling multiple switches. Of these contacts, FIG. 8 shows the contacts $kvb$1, $kvcm$, $kvdn$, $kve$1 and $kvfp$.

Each coupling multiple switch actuates during the path finding one contact; in the present path finding example, the coupling multiple switch KVD, disposed at the first intersection, actuates the contact $kvdn$, the two neighboring coupling multiple switches KVC and KVE thereupon actuate the contacts $kvcm$ and $kve$1, and the further coupling multiple switches KVB and KVF thereafter actuate the contacts $kvb$1 and $kvfp$. The marker closes at such time contacts 3$t$1$j$ and 3$z$11 provided in the setting network shown in FIG. 8. The closure of these contacts effects energization of the auxiliary setting relays which are disposed in and allotted to the individual trunk lines. These relays control contacts for marking in the network of the second setting conductors, part of which is shown in FIG. 6, the corresponding trunk lines. As already described before, in such network are among others connected the setting windings I of the coupling relays of the relay couplers. The coupling relays belonging to the selected connection path are energized responsive to actuation of the contacts controlled by the auxiliary setting relays, in the assumed example, responsive to actuation of contacts $hbcm$1, $hcdnm$, $hde$1$m$ and $hefp$1, jointly with the actuation of the contacts 2$t$1$j$ and 2$z$11 (FIG. 6) controlled by the marker. The coupling relays actuate the coupling point contacts which are controlled thereby. As already explained in connection with the description of the first variant of path finding, the speech current or line conductors belonging to the selected connection path are thereby switched through and, as shown in FIG. 10, the corresponding coupling point contacts disposed in the private conductor associated with these line conductors are actuated and held in actuated position by the described switching means.

In case cross-coil switches are used as multiple switches, the setting will be effected by means of the networks of setting conductors and private conductors, parts of such networks being shown in FIGS. 9 and 11.

The network of setting conductors according to FIG. 9 is built up exactly as the network described in connection with FIG. 7, with the only difference that contacts are used which are not actuated by trunk line switches but by coupling multiple switches and which are, accordingly, connected to marking junctures instead of to trunk lines. In FIG. 9, these contacts are marked $kvb$1, $kvcm$, $kvdn$, $kve$1 and $kvfp$. They are actuated by coupling multiple switches which carried out selection operations in the described example. The marker closes at the same time the contacts 2$t$1$j$ and 2$z$11 disposed in the corresponding network. As a consequence, the X and Y coils, disposed in the connecting path according to FIG. 9, will be energized and will actuate the coupling point contacts belonging to such connection path.

The holding of the coupling point contacts is effected by means of a network of private conductors, part of which is shown in FIG. 11. The operation corresponds exactly to that already described before; this also applies to the marking of the busy condition of the seized trunk line by means of the seizure or private relays and the contacts controlled thereby.

In the variants of path finding operations that have so far been described, the first intersection was assumed to be located midway of the coupling field. This intersection may, however, be located in any variant of the system at any desired point of the coupling field. Its location will under given circumstances be determined with regard to the adopted grouping plan. The grouping plan with respect to which the path finding according to the invention has been explained, provided always only one trunk line extending between two coupling multiples of neighboring coupling stages. In case of grouping plans providing for a plurality of trunk lines, the first variant of path finding may be directly employed because it provides for determination of certain trunk lines. If the path finding is effected in accordance with one of the other variants, the pathfinder networks will have to be expanded by trunk line switches for additionally effecting a selection between trunk lines extending between one and the same coupling multiple.

Attention may be called to the fact that, so far as is compatible with the grouping plan, some simplification may be obtained in case of the first variant of path finding, shown in FIG. 3. This is the case when the grouping plan requires always only one trunk line extending between two coupling multiples of neighboring coupling stages, as has been initially assumed.

In such case, when a trunk line has in the path finding been determined between two coupling stages at the first intersection, the further intersections may be located so that one trunk line conductor may always be omitted in the course of the connection path resulting in the pathfinder network. The further intersections and therewith the trunk lines selected there will then always lie between the second next and the following coupling stage. Two trunk lines determine in such spacing a single trunk line lying therebetween in the course of the connection path and a selection operation is for such trunk line unnecessary. This may be explained by describing an example.

When a trunk line has been determined in the path finding between the coupling stages D and E, as shown in FIG. 3, a trunk line can immediately be selected between the coupling stages B and C; the selected trunk line between the coupling stages D and E being connected to a predetermined coupling multiple in the coupling stage D and the selected trunk line between the coupling stages B and C being connected to a predetermined coupling multiple in the coupling stage C. Therefore, a certain trunk line is determined between the coupling stages D and C, namely, the one which is connected to the corresponding coupling multiples. A corresponding procedure may be followed if the path finding is to be continued over further coupling stages. Accordingly, so far as the path finding is concerned, the trunk line selector ZLCD shown in FIG. 3 may be omitted and the lines connected respectively to its inputs and associated outputs may be interconnected.

This simplified path finding may also be carried out when the requirement, according to which only one trunk line extends always between coupling multiples of neighboring coupling stages, applies only to the coupling stages between which there is no intersection and no trunk line selector switch; in such case, a single trunk line will be determined by the trunk lines determined at the neighboring intersections. If several trunk lines extend between neighboring coupling multiples, in case of coupling stages between which there is no intersection, trunk line selectors will have to be provided at the corresponding places to effect auxiliary selection between such trunk lines.

As noted before, the invention may also be employed for hunting, selecting and effecting connection paths in the case of coupling fields built up according to grouping plans differing from the one shown in FIG. 1. Since the pathfinder networks are in the system according to the invention superposed upon the coupling field as a part thereof and, therefore, built up according to the same grouping plan, and since as many way portions are determined upon hunting and selecting, as are necessary to determine completely a given connection path, it follows, that this pathfinder system can also be employed for coupling fields built up according to desired grouping plans. In the pathfinder trunk routing system according to the invention, the marking potential placed on the corresponding inlet and outlet is propagated or extended to a first intersection in the pathfinder network at which a suitable way or route portion can accordingly be selected, thus reducing the number of way portions to be determined by one such way portion. The operations in determining the next way portion are, so far as the principle is concerned, the same as before, whereby the number of way portions is again reduced by one. The necessary further way portions are determined in the same manner. Inasmuch as a connection path is in any grouping determined by a finite number of way portions, it follows, that the system can be employed in connection with any desired and suitable grouping.

Figure 12:
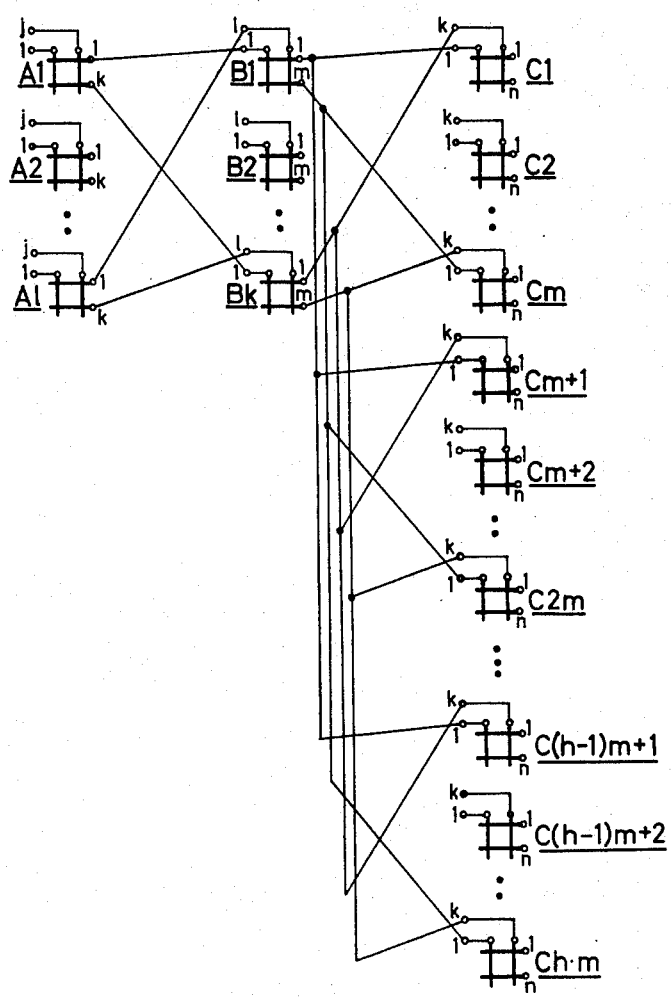
FIGS. 12, 13 and 14 show parts of other grouping plans for the circuit arrangement according to the invention.
Figure 13:
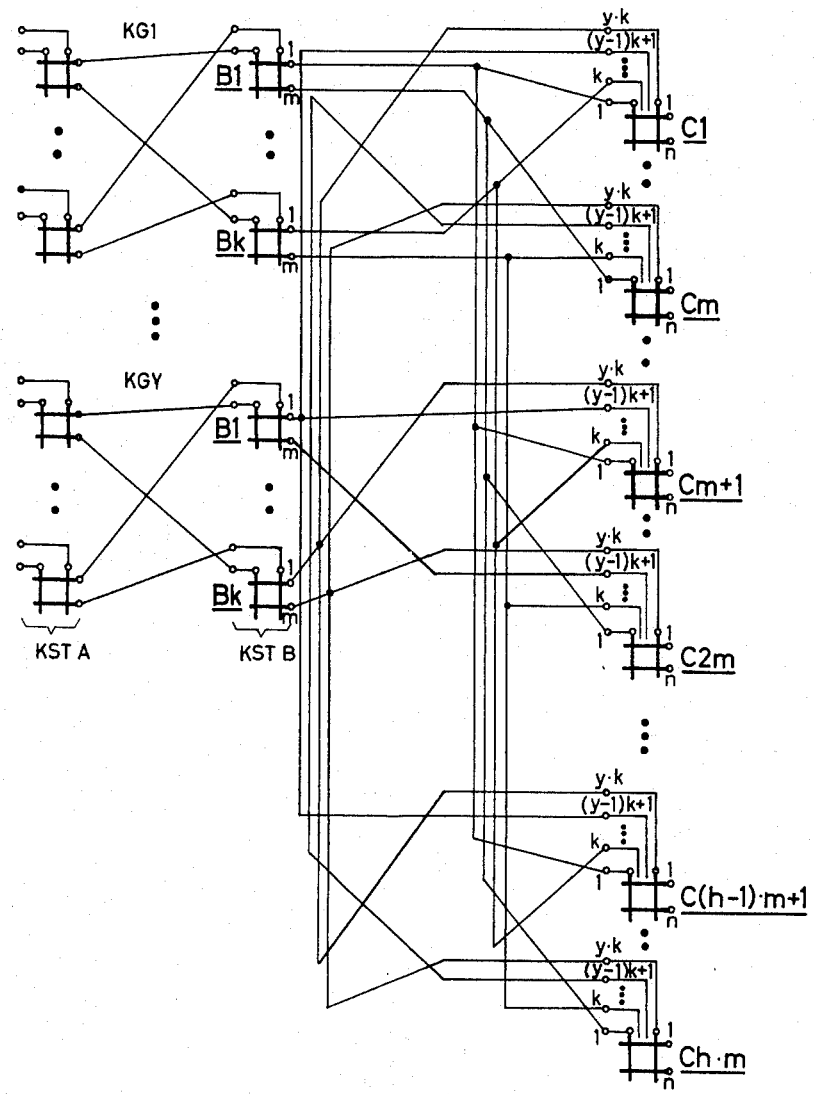
Figure 14:
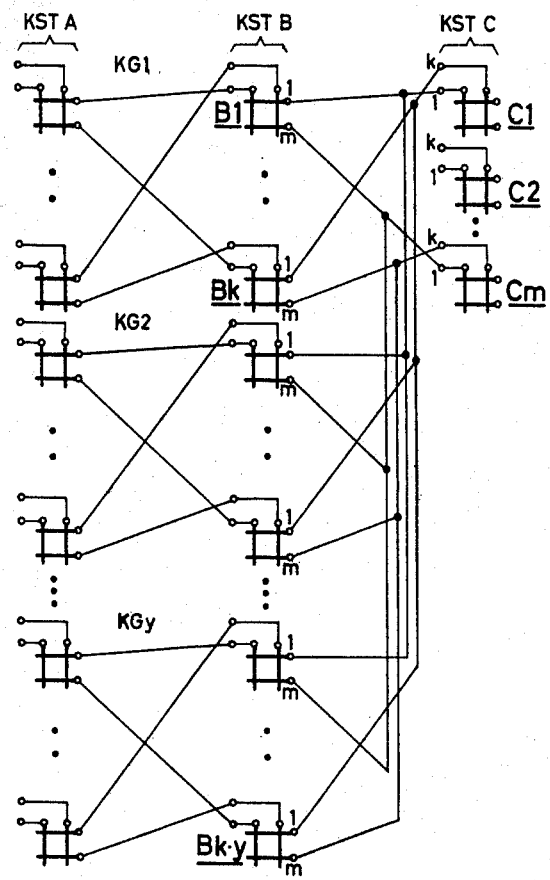

FIGS. 12, 13 and 14 show examples of groupings that may be employed in connection with coupling fields. In the grouping plan according to FIG. 1, the number of inlets of a coupling stage is equal to the number of outlets of the preceding coupling stage, and only one trunk line is always connected to the respective terminals of the coupling multiples. This is not true in case of the variants according to FIGS. 12, 13 and 14.

FIG. 12 shows three coupling stages A, B and C belonging to a coupling field. These coupling stages may lie between the inlets of the coupling field and the first intersection. The trunk lines between the coupling stages A and B are disposed exactly as in the grouping plan according to FIG. 1 while the trunk lines between the coupling stages B and C are disposed differently. The coupling stage C has more inlets than there are outlets from the coupling stage B, the number of such inlets being an integral multiple of the number of the corresponding outlets. The coupling multiples of the coupling stage C are disposed in groups, the coupling multiples of each of these groups having as many inlets as the coupling stage B has outlets. The inlets of each of these groups of coupling multiples are connected with the outlets of the coupling stage B in the same manner as before, so that always one trunk line extends between a coupling multiple of the coupling stage B and a coupling multiple of each of these groups. The coupling stage B has according to FIG. 12 $k$-coupling multiples and the coupling stage C has $h$-groups of coupling multiples with respectively $m$-coupling multiples, therefore a total of $h.m$-coupling multiples. Accordingly, $h$-trunk lines are connected to each outlet of the coupling multiples of the coupling stage B. The arrangement of trunk lines between the coupling stages B and C may also be referred to as extended staggering. In case a given grouping plan demands that the number of inlets of a succeeding coupling stage do not represent an integral but a broken multiple of the number of outlets of the preceding coupling stage, this may be obtained by providing for one group of coupling multiples of the succeeding stage fewer inlets than for the others. It is in this manner possible to form a staggering with desired relationship between the number of terminals of neighboring coupling stages. Incident to the path finding, route portions are now successively determined, which lie in successive coupling stages having progressively greater spacing from the first intersection. When a coupling multiple C or a trunk line BC is determined incident to the path finding, such staggering, assuming that the inlets of the coupling field are at the coupling stage A, will determine the connection path from the coupling stage C to a certain inlet. If there are further coupling stages between the coupling stage A and the inlets of the coupling field, the path finding will have to be extended to the coupling stage B and if necessary to further coupling stages. If the pathfinder networks exhibit in such a case the same staggering, the path finding operations according to the invention may be applied in the same manner. Since the path finding is effected in mirror symmetrical manner from the intersection towards both sides of the coupling field, it is clear that staggering may also be provided between the intersection and the outlets of the coupling field provided it is built up in mirror image to the one illustrated in FIG. 12.

The arrangement according to FIG. 14 comprises three coupling stages A, B and C containing a restricted staggering between the coupling stages B and C. It shall be assumed that these three coupling stages are likewise disposed between the inlets and the first intersection of the coupling field. The arrangement of the trunk lines between these coupling stages corresponds exactly to that of FIG. 12 when it is assumed that the coupling stages B and C of FIG. 12 are exchanged. The coupling multiples of the coupling stages A and B are respectively subdivided in groups, such groups being mutually interconnected by trunk lines in pairs, forming coupling groups. These are the coupling groups KG1 to KG$y$. The determination, in the course of the path finding, of a trunk line between the coupling stages B and C also clearly determines in the staggering a connection path from the coupling stage C to a certain input of the coupling field, it being assumed thereby that the inputs of the coupling field lie at the coupling stage A. This connection path is determined even when only one coupling multiple is involved; for, due to the subdivision of the coupling stages A and B into coupling groups, whose outlets are respectively connected to the inlets of the coupling stage C, there will be only one connection path from each inlet of the coupling stage A to each coupling multiple C. If there are further coupling stages between the coupling stage A and the inlets of the coupling field, the path finding must be extended over further coupling stages of corresponding number so as to clearly determine a connection path. The restricting staggering may be arranged in mirror symmetrical manner between the outlets of the coupling field and the first intersection just as the extended staggering. A selection must be effected in the path finding between the coupling multiples of the coupling stage B, but it will suffice to provide for this purpose a coupling multiple selector which has as many outlets as there are coupling multiples contained in the coupling groups. For the grouping example according to FIG. 14, there will suffice $k$ inlets and $k$ outlets. The place of the coupling multiple to be used in a coupling group can be determined with such selector. The coupling group as such will be determined by the inlet to which the connection path is to extend. A coupling multiple is individually determined by both requirements.

FIG. 13 shows three coupling stages A, B and C in a grouping coupling stages B and C which may in a sense be considered as having been produced by multiplying the staggering illustrated in FIG. 12. Between the outlets of the coupling group KG1 and the inlets 1 to $k$ of the coupling multiples C1 to Ch.m. of the coupling stage C, there are provided intermediate lines which are arranged exactly as those extending between the coupling stages B and C of FIG. 12. There are in the coupling stages A and B several, namely, $y$ coupling groups corresponding to the coupling group KG1 and which are over intermediate lines respectively connected with further sets of $k$ inlets of the coupling multiples C1 to Ch.m, respectively in the same manner as in the coupling group KG1. Since this grouping has been produced merely by multiplying the one illustrated in FIG. 12, there will apply the same rules as for the grouping according to FIG. 12. However, if individual groups of inlets or outlets belong to the coupling groups KG1 to KGy, and if a selection is required between the coupling multiples of the coupling stage B, there may be provided in the pathfinder network a coupling multiple switch as in the grouping according to FIG. 14, which has only as many inlets and outlets as there are coupling multiples in the coupling group of the coupling stage B, since a certain coupling group is determined by the determination of the inlet and outlet to be inter-connected.

Figure 15:
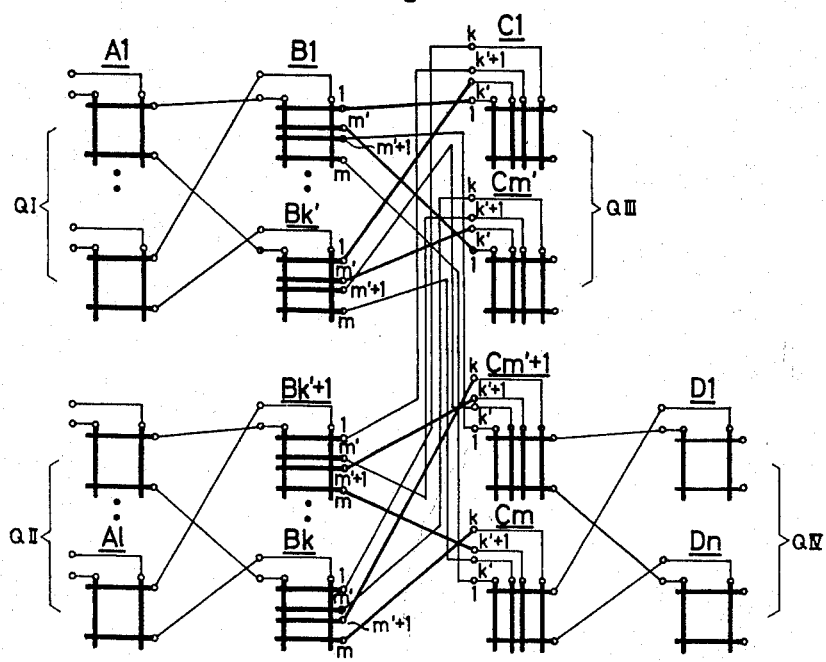
FIG. 15 illustrates an example for the joining of two coupling fields.

Groping measures according to FIGS 12, 13 and 14 may be combined in one and the same coupling field. Very differently constructed coupling fields may be produced in this manner. Two respectively independent coupling fields may moreover be mutually interconnected by connecting parts of the outlets of a coupling stage of the first coupling field with part of the inlets of the coupling stage of the second coupling field, and connecting part of the inlets of the coupling field of the coupling stage neighboring to the following coupling stage of the first coupling field, which were initially left free, with a part of the outlets of the coupling stage of the second coupling field neighboring to the first coupling stage of the preceding coupling stage of the second coupling field, which were initially also left free. FIG. 15 illustrates an example of such a joining of two coupling fields.

The first coupling field has the inlets QI and the outlets QIII and the second has the inlets QII and the outlets QIV. The joining is effected between the coupling stages B and C. Each coupling multiple of the coupling stage B has $m$ outlets and each coupling multiple of the coupling stage C has $k$ inlets in both coupling fields. The respective $m'$ outlets of these coupling multiples are respectively connected over trunk lines with the first $k'$ inlets of the coupling multiple of the coupling stage C of one and the same coupling field. The outlets $m'+1$ to $m$ of the coupling multiple of the coupling stage B are connected over trunk lines with the inlets $k'+1$ to $k$ of the coupling multiples of the coupling stage C of the respectively other coupling field.

This manner of inter-joining also allows establishing connection paths between inlets QI of the first coupling field and the outlets QIV of the second coupling field as well as between the inlets QII and outlets QIII of the first coupling field. If the networks of the setting conductors and seizure or private conductors are built up analogously, a joining over both coupling fields will be present, and the hunting, selecting and setting according to the new system can be effected from connection paths which extend in part over both coupling fields.

The path finding procedures according to the invention are likewise applicable in connectilon with joined coupling fields, since the hunting operation, as described in connection with the path finding, is based upon coincidence of marking potentials at the first intersection, followed by a selection operation among the corresponding way portions, thereafter followed at further intersections by further hunting and selection operations, and since these operations are similarly effected despite the joining of the coupling fields.

The joined coupling fields may be built up in accordance with the grouping plans differing from the one shown in FIG. 15. They may, for example, exhibit staggering between the coupling stages, etc.

Changes may be made within the scope and spirit of the appended claims in which is defined what is believed to be new and desired to have protected by Letters Patent.

We claim:
1. A coupling field selection system comprising a desired plurality of coupling stages, trunk lines extending between the coupling stages, a pathfinder network for effecting the hunting of idle trunk lines which are available for connection paths to be established, pathfinder conductors in said pathfinder network allotted to the trunk lines, marker means for simultaneously marking the inlet and outlet belonging to a desired connection, means for transmitting said marking over idle pathfinder conductors of the pathfinder network which are alloted to idle trunk lines to an intersecting point in directions away from said inlet and outlet, said pathfinder conductors extending through the pathfinder network and parallel to a coupling stage to effect marking of possible connection paths extending between the inlet and outlet, the hunting for and selecting and setting idle connection paths being effected by means for marking at such intersection point a way portion included in the marked connection paths, means for transmitting such marking in directions opposite to the initial marking effected in the pathfinder network to further intersection points which are disposed in the direction of the inlet and outlet of the coupling field, means for thereupon selecting at said intersection points from the connection paths containing the first selected way portions further corresponding way portions, means for continuing analogous selection of further way portions from intersection point to intersection point to establish in the pathfinder network the route which determines the desired connection path between the inlet and outlet, and means for switching said determined connection path through.

2. A system and cooperation of parts according to claim 1, comprising a circuit arrangement for effecting said hunting for and selecting and setting of idle connection paths, said circuit arrangement comprising first and second pathfinder conductors in said pathfinder network, means for transmitting over said first pathfinder conductors the marking extending respectively from the inlet and outlet to the first intersection point, means for transmitting over said second pathfinder conductors the oppositely effective marking to the further intersection points, centrally arranged switches respectively disposed at the individual intersection points, means controlled by said switches for the selection of the corresponding way portions and for simultaneously marking the corresponding way portions in a setting network which is separate from the pathfinder network and includes conductors which are likewise allotted to the trunk lines, coupling point contacts constituting setting switching means included in said way portions, said last named marking being operative to effect actuation of the corresponding coupling point contacts for the purpose of switching the desired connection path through.

3. A system and circuit arrangement according to claim 2, wherein said first and said second pathfinder conductors terminate respectively in a juncture serving for the marking and allotted to the corresponding coupling multiple at points of termination of the respectively associated trunk lines.

4. A system and circuit arrangement according to claim 2, comprising a network of seizure conductors extending in the coupling field by way of coupling point contacts, and seizure switching means for each trunk line, said seizure switching means being operative to prevent the transmission of the marking at the utilized trunk line conductor of the network of the first pathfinder conductors when the corresponding trunk line is busy.

5. A system and circuit arrangement according to claim 2, comprising decoupling rectifiers, disposed in said first pathfinder conductors for directing said marking solely in the direction of said first intersection point.

6. A system and circuit arrangement according to claim 2, comprising switching means for actuating said coupling point contacts, and means for disposing said switching means in a network of setting conductors which is superposed upon the coupling field.

7. A system and circuit arrangement according to claim 6, comprising switching means connected to the network of seizure conductors for holding actuated coupling point contacts in actuated position thereof.

8. A system and circuit arrangement according to claim 7, wherein the marking of the pathfinder network and of the setting network is removed responsive to the operative actuation of said holding switching means.

9. A system and circuit arrangement according to claim 2, wherein the way portions disposed at the respective intersection points correspond respectively to individual trunk lines.

10. A system and circuit arrangement according to claim 9, wherein said intersection points are disposed to exclude one trunk line conductor in the course of the resulting connection path in the pathfinder network.

11. A system and circuit arrangement according to claim 9, comprising coincidence circuits having inlets respectively connected in the first pathfinder conductors at the first intersection point, an intermediate line selector controlled over said inlets, the outlets of said selector being respectively allotted to the trunk lines at the corresponding intersection points, and means responsive to a selection operation for marking one of said outlets.

12. A system and circuit arrangement according to claim 11, wherein the outlets of said trunk line selector are at said first intersection point individually connected to the respectively associated second pathfinder conductors disposed at the corresponding intersection point, said second pathfinder conductors being at the further intersection points individually respectively extended over inlets and outlets of further trunk line selectors at each further intersection point, whereby the second pathfinder conductors coming from the first intersection point operate respectively each over a coincidence circuit in connection with an inlet of the corresponding trunk line selector, the second inlet of said coincidence circuit being connected to an associated first pathfinder conductor, said trunk line selector being subsequent to marking of inlets effective to mark one outlet thereof.

13. A system and circuit arrangement according to claim 12, wherein the setting network extends by way of setting windings of coupling relays, rectifier means for decoupling said setting windings, and means for carrying out the respective marking of the selected trunk lines by the corresponding trunk line selector and of the corresponding inlet and outlet of the coupling field so as to effect operative actuation of the coupling relays.

14. A system and circuit arrangement according to claim 13, comprising holding windings for said coupling relays which are disposed in the seizure conductors at the coupling points in series relationship with the coupling point contacts.

15. A system and circuit arrangement according to claim 11, wherein the conductors of said setting network, at places where the corresponding trunk lines end in coupling multiples, terminate respectively in marking junctures respectively allotted to the corresponding coupling multiple, and decoupling rectifiers connected in all conductors of the setting network belonging to trunk lines, said rectifiers being poled to permit current flow required for the energization of the setting switching means.

16. A system and circuit arrangement according to claim 15, employing cross-coil switches, comprising setting coils serving respectively for an inlet row of a coupling multiple, such setting coils being respectively connected in the setting conductors belonging to such inlet row, further setting coils serving respectively an outlet row of a coupling multiple, said further setting coils being respectively connected in the setting conductors allotted to the respective outlet rows, and means for respectively marking the setting conductors of selected trunk lines by the trunk line selector and the corresponding inlet and outlet of the coupling field to energize the setting coils for the purpose of operatively actuating the corresponding coupling point contacts.

17. A system and circuit arrangement according to claim 16, comprising holding coils disposed in the network of the seizure conductors and connected to those of the seizure conductors which are allotted to the rows of the coupling multiple which are being served by the setting coils respectively operatively associated with the holding coils.

18. A system and circuit arrangement according to claim 3, wherein said intersection points are positioned so that the correspondingly disposed way portions represent marking joints corresponding respectively to coupling multiples.

19. A system and circuit arrangement according to claim 18, wherein said intersection points are mutually displaced by one coupling stage.

20. A system and circuit arrangement according to claim 19, comprising coincidence circuits at the first intersection point having the inlets thereof connected to the marking junctures of the network of the first pathfinder conductors, said coincidence circuits being cooperatively connected with a coupling multiple selector having outlets allotted to the coupling multiples, one of said outlets being marked responsive to a selection operation, and means for connecting the outlets of said coupling multiple selector individually with the marking junctures disposed at the corresponding intersection point in the network of the second pathfinder conductors.

21. A system and circuit arrangement according to claim 20, comprising further coupling multiple selectors connected at further intersection points to the marking junctures disposed in the network of the second pathfinder conductors, each second pathfinder conductor extending from the first intersection point to the corresponding marking juncture by way of a coincidence circuit having its second input connected to the first pathfinder conductor, the marking of one or more inlets of a coupling multiple selector effecting by a selection operation thereof the marking of one outlet for the purpose of selecting from the marking junctures of an intersection point one such marking juncture.

22. A system and circuit arrangement according to claim 19, comprising coupling multiple selectors connected at the further intersection points to the marking junctures disposed in the network of the second pathfinder conductors, coincidence circuits disposed ahead of the inlets of the respective coupling multiple selectors, one inlet of the respective coincidence circuits being connected to the corresponding marking juncture and the other inlet thereof being connected to the respectievly associated marking juncture in the network of the first pathfinder conductors, seizure switching means for inhibiting in the presence of busy condition the extension of the marking in the network of the second pathfinder conductors, and decoupling rectifiers connected in said second pathfinder conductors for effecting extension of the marking criterion only in a direction away from the first intersection point, the marking of one or more inlets of a coupling multiple selector causing such selector to execute a selection operation for marking one outlet for the purpose of selecting thereby one of the marking junctures of the corresponding intersection point.

23. A system and circuit arrangement according to claim 21, utilizing relay couplers, comprising a setting network having first and second conductors, the network of said first conductors extending over marking junctures, decoupling rectifiers and auxiliary setting means connected in the trunk line conductors, there being respectively effected a marking of the selected coupling multiples by the corresponding coupling multiple selectors and of the corresponding inlet and outlet of the coupling field to cause energization of the auxiliary setting means in the course of the selected connection path.

24. A system and circuit arrangement according to claim 23, wherein the network of the second setting conductors extends over setting windings of coupling relays which are decoupled by rectifiers, there being respectively effected a marking of two setting conductors by said auxiliary setting means and of the corresponding inlet and outlet of the coupling field to cause energization of the corresponding coupling relays.

25. A system and circuit arrangement according to claim 24, comprising holding windings for said coupling relays, and means for disposing said holding windings in the seizure conductors in series with the coupling point contacts.

26. A system and circuit arrangement according to claim 21, utilizing coordinate switches, wherein the conductors of the setting network, at points where the corresponding trunk lines end in the coupling multiple, respectively terminate in marking junctures allotted to the corresponding coupling multiple, and decoupling rectifiers disposed in the respective trunk line conductors of the setting network which are poled so as to permit current flow for the energization of the setting switching means.

27. A system and circuit arrangement according to claim 26, utilizing cross-coil switches, wherein the setting coil respectively serving an inlet row of a coupling multiple is connected to the setting conductor belonging to the corresponding inlet row and wherein the setting coil serving the outlet row of a coupling multiple is connected to the setting conductor belonging to such outlet row, there being respectively effected a marking of the marking junctures belonging in the setting network to the selected coupling multiples by the coupling multiple selectors and of the corresponding inlet and outlet to cause energization of the setting coils for actuating the corresponding coupling point contacts.

28. A system and circuit arrangement according to claim 27, comprising holding coils disposed in the network of the seizure conductors and connected to those of the seizure conductors which belong to the rows in the coupling multiples which are being served by setting coils respectively operatively associated with corresponding holding coils.

References Cited in the file of this patent

UNITED STATES PATENTS

| | | |
|---|---|---|
| 2,585,904 | Busch | Feb. 19, 1952 |
| 2,588,052 | Shepherd | Mar. 4, 1952 |
| 2,780,674 | Six | Feb. 5, 1957 |
| 2,843,674 | Ketchledge | July 15, 1958 |
| 2,859,282 | Dunlap et al. | Nov. 4, 1958 |
| 2,883,467 | Ketchledge | Apr. 21, 1959 |
| 2,883,470 | Jacoby et al. | Apr. 21, 1959 |
| 2,911,477 | Gohorel et al. | Nov. 3, 1959 |
| 2,925,474 | Kinsey | Feb. 16, 1960 |